(12) United States Patent
Zhuang et al.

(10) Patent No.: US 9,635,735 B2
(45) Date of Patent: Apr. 25, 2017

(54) MASTER ILLUMINATING DEVICE, ILLUMINATING DEVICE AND ILLUMINATION CONTROL SYSTEM

(71) Applicant: OSRAM GmbH, Munich (DE)

(72) Inventors: XiHe Zhuang, Guangdong (CN); Middel Tjaco, Guangdong (CN); Daxin Lin, Guangdong (CN); Xuewei Dai, Guangdong (CN); Zesheng Ye, Guangdong (CN)

(73) Assignee: OSRAM GmbH, Munich (DE)

( * ) Notice: Subject to any disclaimer, the term of this patent is extended or adjusted under 35 U.S.C. 154(b) by 0 days.

(21) Appl. No.: 14/359,109

(22) PCT Filed: Nov. 26, 2012

(86) PCT No.: PCT/EP2012/073619
§ 371 (c)(1),
(2) Date: May 19, 2014

(87) PCT Pub. No.: WO2013/079441
PCT Pub. Date: Jun. 6, 2013

(65) Prior Publication Data
US 2014/0320028 A1    Oct. 30, 2014

(30) Foreign Application Priority Data
Nov. 28, 2011  (CN) .......................... 2011 1 0385667

(51) Int. Cl.
*H05B 41/36*    (2006.01)
*H05B 37/02*    (2006.01)
*F21S 4/00*    (2016.01)

(52) U.S. Cl.
CPC ..... *H05B 37/0227* (2013.01); *H05B 37/0272* (2013.01); *Y02B 20/40* (2013.01)

(58) Field of Classification Search
CPC ... H05B 37/0272; F21V 23/004; F21V 29/22; F21K 9/00
(Continued)

(56) References Cited

U.S. PATENT DOCUMENTS 5,442,532 A * 8/1995 Boulos et al. ................. 362/276
2010/0106306 A1* 4/2010 Simon et al. ................. 700/276
(Continued)

FOREIGN PATENT DOCUMENTS

CN    201100579 Y    8/2008
CN    201363654 Y    12/2009
(Continued)

OTHER PUBLICATIONS

Author: Michael Allcock, Title: Lighting apparatus, Date:Nov. 29, 2009, Publish date: Jan. 6, 2011, pp. 1-23.*
(Continued)

*Primary Examiner* — Douglas W Owens
*Assistant Examiner* — Wei Chan
(74) *Attorney, Agent, or Firm* — Hayes Soloway PC

(57) ABSTRACT

A master illuminating device may include an illuminating module, and a signal acquisition and processing unit for detecting the surrounding and outputting a control signal. The illuminating module is designed to receive the control signal and is driven according to the control signal. The illuminating device further include a signal transmission unit which is designed to receive the control signal and is designed to transmit the control signal.

12 Claims, 2 Drawing Sheets

(58) Field of Classification Search
USPC ........ 362/217.01–217.17; 315/159, 291, 294
See application file for complete search history.

(56) References Cited

U.S. PATENT DOCUMENTS

| | | |
|---|---|---|
| 2010/0117558 A1* | 5/2010 | Lee .......................... F21K 9/00 |
| | | 315/294 |
| 2010/0208460 A1 | 8/2010 | Ladewig et al. |
| 2011/0095690 A1 | 4/2011 | Sagal |
| 2011/0122621 A1* | 5/2011 | Chen ......................... F21K 9/17 |
| | | 362/249.02 |
| 2011/0211351 A1 | 9/2011 | Van De Ven et al. |
| 2012/0002415 A1* | 1/2012 | Nelson et al. ................. 362/235 |
| 2012/0014108 A1* | 1/2012 | Greenfield et al. ........... 362/294 |

FOREIGN PATENT DOCUMENTS

| | | |
|---|---|---|
| CN | 202001878 U | 10/2011 |
| DE | 202010012962 U1 | 4/2011 |
| GB | 2475724 A | 6/2011 |
| WO | 03098977 A1 | 11/2003 |
| WO | 2010124315 A1 | 11/2010 |

OTHER PUBLICATIONS

International Search Report issued in the corresponding PCT application No. PCT/EP2012/073619, dated Feb. 26, 2013.
Chinese Office Action based on application No. 201110385667.4 (12 pages + 7 pages English translation) dated Jun. 3, 2016 (for reference purpose only).

* cited by examiner

MASTER ILLUMINATING DEVICE, ILLUMINATING DEVICE AND ILLUMINATION CONTROL SYSTEM

RELATED APPLICATIONS

The present application is a national stage entry according to 35 U.S.C. §371 of PCT application No.: PCT/EP2012/073619 filed on Nov. 26, 2012, which claims priority from Chinese application No.: 201110385667.4 filed on Nov. 28, 2011, and is incorporated herein by reference in its entirety.

TECHNICAL FIELD

Various embodiments relate to a master illuminating device, an illuminating device driven by the master illuminating device and an illumination control system including the two types of illuminating devices above.

BACKGROUND

In modern society, the illuminating device is widely used for the illumination application, and higher requirements are put on the illumination, for instance, the lamp is required to be capable of being turned on and off automatically and periodically, or capable of providing brightness to different degrees in different applications, higher demands are exerted on the illumination control.

An illumination system is usually controlled with an auto dimming method in office or building. A common solution is using a DALI (digital addressable lighting interface) system to connect individual illumination devices and to adjust operation states thereof. The weak point of this method is a high cost which is reflected on, in one aspect, additional wires for connection with the DALI bus, and in the other aspect, need of control by a complex computer system such as KNX. In addition, the maintenance cost also becomes a problem.

Another solution is to directly use a wireless PIR sensor or an illuminating device having the PIR sensor in the building. In this situation, there is no need to spend too much on wiring or configuring computer hardware, but it cannot form a central control system, then the illuminating devices cannot be controlled separately. For instance, when a person passes by, the PIR sensor is designed to receive a signal and drives all illuminating devices to work, but illuminating devices far away from the person do not need to be driven in this situation, thus, unnecessary power consumption is caused.

SUMMARY

Various embodiments provide a master illumination device that can overcome prior defects and operate as a control device with a low cost but no additional wiring so as to save system energy consumption and be adapted to illumination in a large area.

Various embodiments provide a master illuminating device including an illuminating module and a signal acquisition and processing unit for detecting the surrounding and outputting a control signal, the illuminating module is designed to receive the control signal and is driven according to the control signal, characterized in that the illuminating device further includes a signal transmission unit which is designed to receive the control signal and transmit the control signal. In various embodiments, the master illuminating device not only serves the function of an illuminating device but also acts as a controller advantageously so as to control other objects such as other illuminating device basing on detection of surrounding. For instance, when a person passes by, the master illuminating device can generate a control signal basing on detection of surrounding, the illuminating module turned on according to this control signal and at the same time this control signal is transmitted via signal transmission unit of master illuminating device to control other objects, such as other illuminating device.

In various embodiments, the signal acquisition and processing unit includes a sensor for detecting the surrounding and generating a detection signal and a processor configured to process the detection signal into the control signal. Preferably, the sensor is a PIR sensor, and the processor is a PIR processor. The sensor, especially the pyroelectric infrared sensor that can detect a human movement, has been widely used in various fields, and it is easily available in the market at a low cost. The processor can process the detection signal collected by the sensor so as to obtain the control signal that is to be transmitted to a subsequent electronic element.

In various embodiments, the signal transmission unit includes a wireless receiver for receiving the control signal and an emitter for transmitting the control signal. Preferably, the wireless receiver is a ZigBee module, and the emitter is an antenna. The wireless receiver is designed to receive the control signal output from the signal acquisition and processing unit and is designed to transmit the same. The wireless receiver can be a ZigBee module and also can be other suitable wireless transmission module.

In various embodiments, the master illuminating device further includes a tubular housing and end caps located at both ends of the tubular housing, respectively, wherein the illuminating module is arranged in the tubular housing, and the signal transmission unit and at least part of the signal acquisition and processing unit are arranged in one end cap. Preferably, the sensor is arranged in the end cap. Such configuration retains the structure of the traditional lamp tube and has a high compatibility. As at least part of the signal acquisition and processing unit and the signal transmission unit for wireless communication are advantageously arranged in the end cap, the structure space in the tubular housing is not occupied as compared with the prior art, and the adverse influence that metal shields signal also can be effectively avoided. Therefore, more installation space can be provided for the illuminating module, so that the brightness of the whole master illuminating device is not affected while good wireless communication is realized, and the illumination effect is improved.

In various embodiments, an opening corresponding to a position of the sensor is opened on the end cap. The sensor can acquire the detection signal via the detection opening unobstructedly.

In various embodiments, the sensor is arranged on the processor, and the emitter is arranged on the wireless receiver, and the processor and the wireless receivers are arranged side by side and connected serially, so that a signal is effectively transmitted between the signal acquisition and processing unit and the signal transmission unit.

In various embodiments, the illuminating module includes a light source, a circuit board supporting the light source at one side, and a driver, the driver and the processor are connected together. Such connection manner facilitates assembling and can assure the connection effect between the driver and the processor.

In various embodiments, a plurality of LEDs as a light source are arranged at one side of the circuit board, thus, energy-efficient illumination is realized via the LED light source.

Preferably, the illuminating module further includes a heat sink which is arranged at one side of the circuit board facing away from the light source, and the driver is arranged at one side of the heat sink facing away from the circuit board. To arrange the heat sink between the driver and the circuit board not only can support the two with the heat sink but also can make a full use of the limited space, thus enough LEDs can be arranged on the circuit board for improving the illuminance.

In various embodiments, the tubular housing includes an upper housing and a lower housing capable of being assembled together. The upper housing or the lower housing of the tubular housing is formed as one part of the heat sink for further improving the heat dissipation effect.

Preferably, respective end cap is made from a plastic, which ensures that the wireless communication signal is not subject to shielding, a manufacturing cost can be reduced and the weight of the illuminating device itself can be alleviated. Other suitable light-weight materials reducing or eliminating shield also may be taken into consideration for making the end caps.

Various embodiments further relate to an illuminating which is designed to receive a control signal transmitted from the master illuminating device above and is driven according to the control signal. Correspondingly, there is a wireless receiver installed in respective illuminating device for receiving a control signal from the master illuminating device.

Various embodiments further relate to an illumination control system including the two types of illuminating devices above, wherein the master illuminating device is designed to transmit a control signal to respective second illuminating device for respectively controlling second illuminating device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
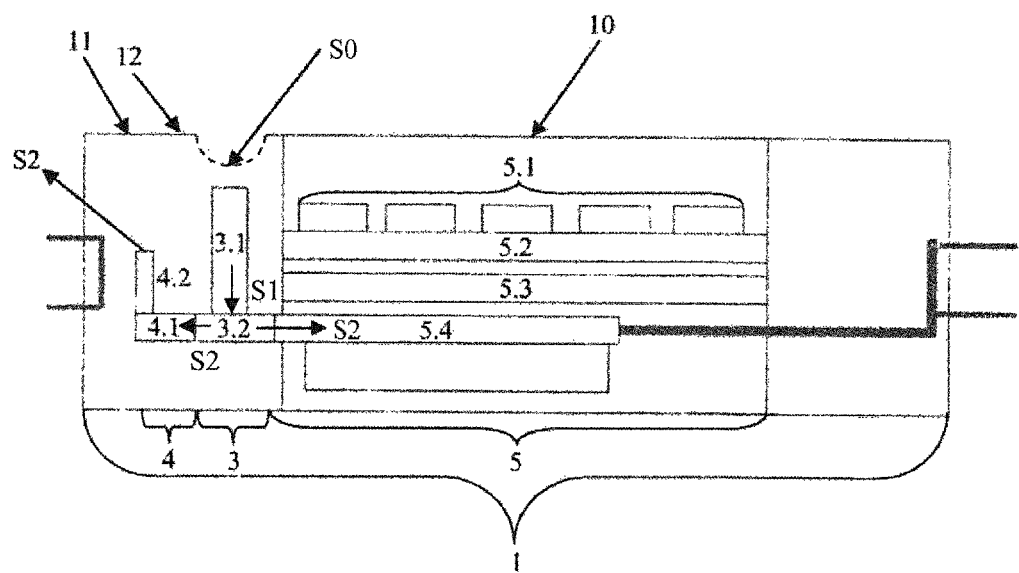
FIG. 1 is a schematic diagram of an inner structure of an exemplary embodiment of a master illuminating device of the present disclosure, wherein the master illuminating device has a tubular shape.

FIG. 1 is a schematic diagram of an inner structure of an exemplary embodiment of a master illuminating device of the present disclosure, wherein the master illuminating device 1 has a tubular shape. The master illuminating device 1 having a wide universality comprises a tubular housing 10 and two end caps 11 located at both ends thereof. In addition, the master illuminating device 1 further comprises a signal acquisition and processing unit 3 and a signal transmission unit 4 in the same end cap 11, and an illuminating module 5 arranged in the tubular housing 10. In the illumination control system 100 of the present disclosure, the signal acquisition and processing unit 3 comprises a sensor 3.1 and a processor 3.2, the signal transmission unit 4 comprises a wireless receiver 4.1 and an emitter 4.2, and the illuminating module 5 comprises a light source 5.1, a circuit board 5.2, a heat sink 5.3 and a driver 5.4. The sensor 3.1 is a PIR sensor (pyroelectric infrared sensor), for instance, that can detect a human movement or other similar sensor. Correspondingly, the processor 3.2 is a processor suited to PIR. The wireless receiver 4.1 preferably is a ZigBee module, for example, or other wireless communication module with a similar function, and the emitter is a corresponding antenna.

The sensor 3.1 for outputting the detection signal SI is arranged in one end cap 11 at one side of the tubular housing 10, and a detection opening 12 is opened on this end cap 11 at a position corresponding to the sensor 3.1 in order to assure the sensor 3.1 to output the detection signal S1 unobstructedly. The sensor 3.1 is fixedly arranged on the processor 3.2 for acquiring the surrounding signal SO and outputting the detection signal S1, and the processor 3.2 processes the detection signal S1 into the control signal S2. One end of the processor 3.2 is inserted into the tubular housing 10 to be connected with the driver 5.4 of the illuminating module 5, as a result, the control signal S2 can be transmitted to the driver 5.4; and the other end of the processor 3.2 is connected with the wireless receiver 4.1 with the emitter 4.2 fixed thereon to forward the control signal S2. Herein, the wireless receiver 4.1, the processor 3.2 and the driver 5.4 are connected together. By connecting the three directly the assembling can be easy, and the communication effect between the signal acquisition and processing unit 3, the signal transmission unit 4 and the illuminating module 5 can be assured, and communication interruption due to wiring connection or short-circuit caused by unreasonable wire connection can be reduced as much as is possible In one preferred embodiment, the end cap 11 made from a light material such as plastic not shielding wireless signal is connected with the tubular housing 10, whereby respective components of the end caps 11 and the tubular housing 10 may be conveniently assembled. The circuit board 5.2, the heat sink 5.3 and the driver 5.4 are stacked layer by layer in the tubular housing 10. As the signal acquisition and processing unit 3 and the signal transmission unit 4 do not need to be arranged in the tubular housing 10, the whole tubular housing 10 can be distributed with LEDs, and no dark area will be formed.

The heat sink 5.3 is configured as one part, i.e. a lower housing portion, of the tubular housing 10. In order to prevent the heat sink 5.3 made from a metal material from shielding the wireless signal, the signal acquisition and processing unit 3 and the signal transmission unit 4 with one side connected thereto are both arranged in the end cap 11. Of course, in order to configure the master illuminating device 1 more compact, the processor 3.2 can be arranged in the end cap 11. The other side of the processor 3.2 is connected with the driver 5.4 in the tubular housing 10. An elongated mounting surface of the heat sink 5.3 goes longitudinally through a center of the whole tubular housing 10, the driver 5.4 is fixed at one side of the mounting surface facing the heat sink 5.3, and the circuit board 5.2 of a plurality of LEDs as the light source 5.1 is fixed on the other side of the mounting surface.

Figure 2:
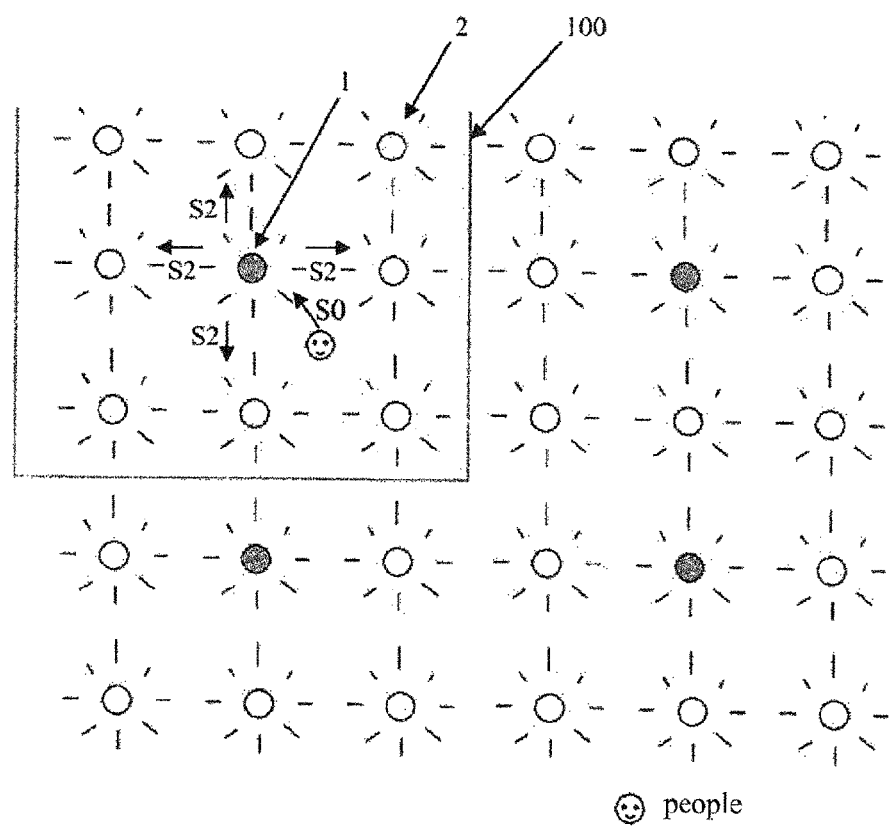
FIG. 2 is a schematic diagram of an illumination control system of the present disclosure.

FIG. 2 is a schematic diagram of an illumination control system of the present disclosure. In an illumination control system 100 of the present disclosure, a solid circular point represents a master illuminating device 1, and a hollow circular point represents a second illuminating device 2. A plurality of second illuminating devices 2 are arranged in a range of a predetermined distance surrounding one master illuminating device 1 so that a control signal S2 from the master illuminating device 1 can be effectively received and a predetermined illumination area is lighted. In the illumination control system 100, a plurality of corresponding second illuminating devices 2 can be automatically controlled by means of the master illuminating device 1, and the master illuminating device 1 itself also serves the function of auto illumination. For instance, only when a human movement is detected, a signal acquisition and processing unit 3 of the master illuminating device 1 acquires a surrounding signal S0 that a person has come into the predetermined illumination area, and outputting a control signal S2 to a plurality of second illuminating devices 2 arranged dispersedly around while it is turned on in a manner of saving the energy consumption of the system, thus, the whole illumination control system 100 is enabled to go into an illumination state to provide required illumination. The illumination control sys-tem 100 of the present disclosure has a low cost without additional wiring and is adapted to illumination in a large area.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS 1 master illuminating device
2 second illuminating device
3 signal acquisition and processing unit
3.1 sensor
3.2 processor
4 signal transmission unit
4.1 wireless receiver
4.2 emitter
5 illuminating module
5.1 light source//LED
5.2 circuit board
5.3 heat sink
5.4 driver
10 tubular housing
11 end cap
12 detection opening
100 illumination control system
S0 surrounding signal
S1 detection signal
S2 control signal

The invention claimed is:

1. A master illuminating device, comprising: an illuminating module, and a signal acquisition and processing unit for detecting the surrounding and outputting a control signal, the illuminating module being designed to receive the control signal and being driven according to the control signal, wherein the master illuminating device further comprises a signal transmission unit which is designed to receive the control signal and is designed to transmit the control signal, wherein the illuminating device further comprises a tubular housing and end caps located at both ends of the tubular housing, respectively, wherein the illuminating module is arranged in the tubular housing, and the signal transmission unit and the signal acquisition and processing unit are arranged entirely in one of the end caps; wherein the signal acquisition and processing unit comprises a PIR sensor, and wherein the end cap comprises an opening corresponding to a position of the PIR sensor; and
wherein the tubular housing of the illuminating module comprises a light source disposed over a circuit board supporting the light source at one side, and the circuit board disposed over a LED driver.

2. The master illuminating device according to claim 1, wherein the signal acquisition and processing unit comprises a processor configured to process the detection signal into the control signal.

3. The master illuminating device according to claim 2, wherein the processor is an MCU.

4. The master illuminating device according to claim 1, wherein the signal transmission unit comprises a wireless receiver for receiving the control signal and an emitter for transmitting the control signal.

5. The master illuminating device according to claim 4, wherein the wireless receiver is a ZigBee module, and the emitter is an antenna.

6. The master illuminating device according to claim 1, wherein the illuminating module further comprises a heat sink where the heat sink is disposed between the circuit board and the driver, wherein the heat sink is arranged at one side of the circuit board facing away from the light source, and the driver is arranged at one side of the heat sink facing away from the circuit board.

7. The master illuminating device according to claim 6, wherein the tubular housing comprises an upper housing and a lower housing capable of being assembled together, and the upper housing or the lower housing of the tubular housing is formed as one part of the heat sink.

8. The master illuminating device according to claim 7, wherein respective end cap is made from a plastic.

9. The master illuminating device according to claim 1, wherein the end caps overlay and/or cover the ends of the tubular housing.

10. The master illuminating device according to claim 1, wherein the PIR sensor is fully covered by the end cap.

11. A master illuminating device, comprising: an illuminating module, and a signal acquisition and processing unit for detecting the surrounding and outputting a control signal, the illuminating module being designed to receive the control signal and being driven according to the control signal, wherein the master illuminating device further comprises a signal transmission unit which is designed to receive the control signal and is designed to transmit the control signal, wherein the illuminating device further comprises a tubular housing and end caps defining a closure at both ends of the tubular housing, respectively, wherein the illuminating module is arranged in the tubular housing, and the signal transmission unit and at least part of the signal acquisition and processing unit are arranged in the tubular housing and entirely within the space defined by one of the end caps; and wherein tubular housing of the illuminating module comprises a light source disposed over a circuit board disposed over a LED driver.

12. The master illuminating device of claim 11 wherein the end caps are formed integrally with the tubular housing.

* * * * *